Sept. 21, 1971  W. WYSS ET AL  3,606,715
SPHERICAL STORAGE TANK FOR GASES AND LIQUIDS
AND SUPPORTING BASE THEREFOR
Filed Nov. 7, 1969  2 Sheets-Sheet 1
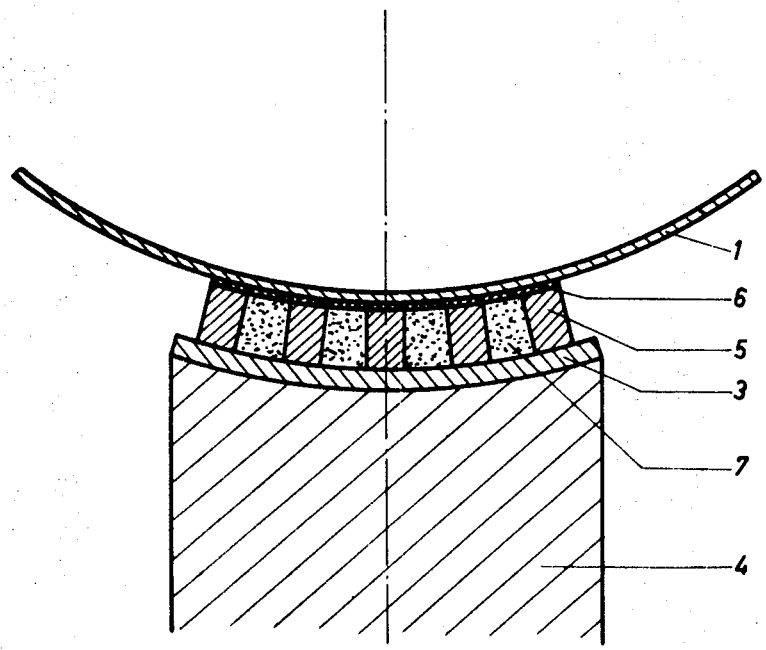
FIG. 1
FIG. 2
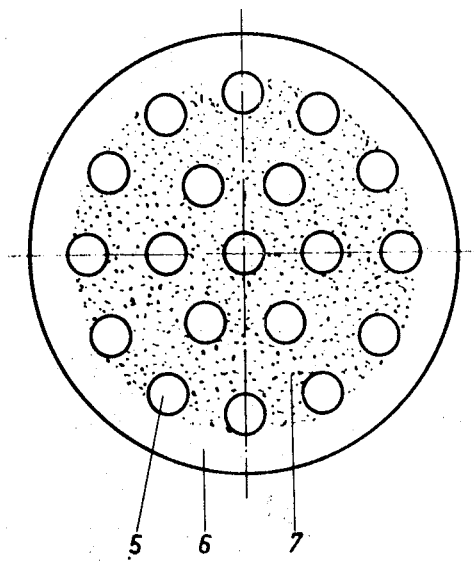
INVENTORS
WALTER WYSS
PETER FEUERLEIN
BY *Abraham A. Saffitz*
ATTORNEY

INVENTORS
WALTER WYSS
PETER FEUERLEIN

BY Abraham A. Saffitz
ATTORNEY

United States Patent Office 3,606,715
Patented Sept. 21, 1971

3,606,715
SPHERICAL STORAGE TANK FOR GASES AND LIQUIDS AND SUPPORTING BASE THEREFOR
Walter Wyss, Pratteln, Switzerland, and Peter Feuerlein, Redingstr. 12, Basel, Switzerland
Continuation-in-part of application Ser. No. 706,518, Feb. 19, 1968. This application Nov. 7, 1969, Ser. No. 874,901
Int. Cl. B65d 87/04; E02d 27/28
U.S. Cl. 52—294                              5 Claims

ABSTRACT OF THE DISCLOSURE

A mounting for a spherical tank holding gases or liquids which is supported on a rigid concrete foundation in a region of the vertical axis of the tank, the mounting consisting essentially of a spaced array of support elements of cellular or sponge structure, such as neoprene or Buna N rubber within a matrix of stiff plastic filler which is elastic and non-hardening, such as a quick-setting epoxy resin or polyethylene sulfide filling material which contains a high proportion of filler. The upper surface of the array of cellular elements and matrix is coated with a bonding adhesive to adhere the mounting to the steel surface of the tank, preferred adhesives being a thermosetting polyethylene sulfide adhesive or a thermosetting epoxy resin. The lower surface of the array is coated with the same bonding adhesive to secure the array to the concrete foundation.

---

This application is a continuation-in-part of our pending application, Ser. No. 706,518 filed Feb. 19, 1968 now abandoned.

This invention provides a spherical tank for gases and liquids resting on a foundation in the region of the vertical axis of the spherical shell of the tank, there being interposed between the foundation and the spherical shell a plurality of compressible supports having a cellular configuration and consisting of an elastomeric material of good compressive properties, and a flexibly elastic composition pressed into the interstitial spaces between the supports, said supports and said composition being adhesively bonded by a bonding layer to the shell of the spherical tank and to the foundation.

This invention relates to a spherical storage tank for gases and liquids and a supporting base therefor. Conventionally spherical tanks are supported by lateral struts attached to the external periphery of the shell of the tank. This method of support is open to the objection that changes in the quantity of fluid contained in the tank tend to cause uncontrollable stresses at the connecting points of the struts. Fractures and possibly even the destruction of the tank may ensue. Moreover, in some parts of the world the occurrence of earth tremors at irregular intervals presents special problems. In such circumstances costly and technically complex precautionary measures must be taken for dealing with the above-mentioned difficulty or the use of spherical tanks may have to be abandoned altogether.

For overcoming these difficulties it has already been proposed to rest the spherical shell of the tank on a specially prepared gravel bed or on a concrete foundation with or without the interposition of a cushioning layer.

However, these solutions also have certain draw-backs and they do not meet the special exigencies that arise in areas where tectonic disturbances are liable to occur.

Furthermore, in hitherto conventional forms of construction availing themselves of the more modern forms of support, it has been impossible to eliminate the risks involved in electrolytic corrosion. Moreover, the transmission of the load from the spherical tanks to the foundations involves problems which, more particularly in cases in which cushioning layers are present, sometimes call for the provision of very complex supplementary arrangements, such as casings for the cushioning bed and the embedment therein of cage elements for the purpose of avoiding an asymmetrical transmission of the load through the cushioning layer and the possibility of lateral displacement.

The object of the present invention is to overcome the above-described difficulties.

This object is attained according to the present invention by the provision of a spherical tank for gases and liquids which rests on a foundation in the region of the vertical axis of the spherical shell of the tank, there being interposed between the foundation and the spherical shell a plurality of compressible supports having a cellular configuration and consisting of an elastomeric material of good compressive properties, and a flexibly elastic composition pressed into interstitial spaces formed between the compressible supports, said supports and said composition being adhesively bonded by a bonding layer to the shell of the spherical tank and to the foundation.

The means thus interposed between the spherical tank and the foundation operate to transmit the load vertically to the foundation and at the same time they admit of compensating horizontal motion without actual displacement.

Several embodiments of the invention will now be described by way of example and with reference to the accompanying drawings, in which:

FIG. 1 is a vertical section through a first embodiment of the invention;

FIG. 2 is a schematic top plan view of the foundation shown in FIG. 1; and

Figure 3:
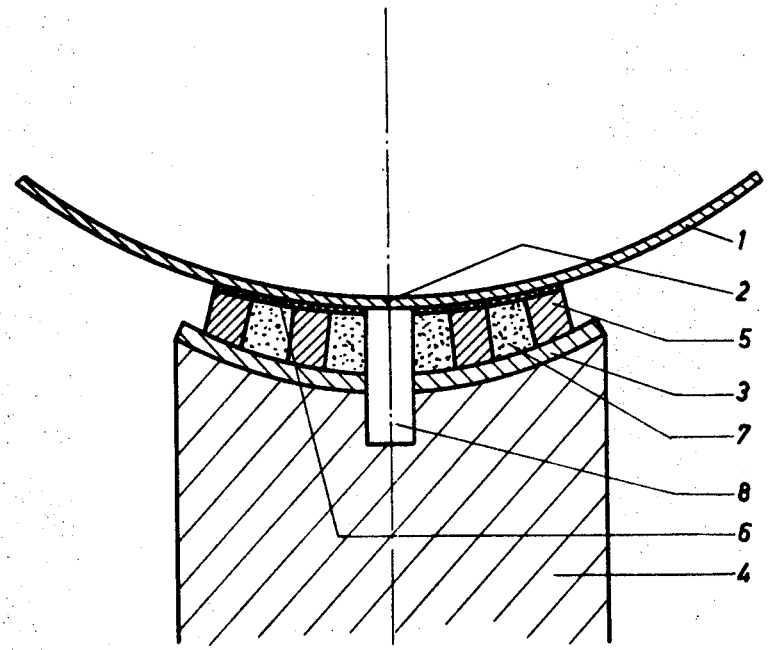
FIGS. 3 and 4 are vertical sections through two further embodiments according to the invention.

FIG. 1 shows part of the spherical shell 1 of a tank intended for the storage of gases or liquids. The spherical shell 1 is supported by a concrete foundation 4 of which the upper surface may be sealed by a bearing shell 3 made for instance of steel. The bearing shell 3 is coated with an adhesive bonding layer and carries thereon a plurality of compressible supports 5 having a cellular configuration and consisting of an elastomeric material having good compressive properties, such as neoprene rubber, preferably of Shore A hardness of 70–95 or butadiene-acrylonitrile copolymer (Buna N) having shore hardness of 65–90. The individual supports 5 are adhesively firmly bonded both to the spherical shell 1 and to the concrete foundation 4 and thus form an intermediate elastomeric bearing bed. A non-elastomeric but flexibly elastic composition 7 which is preferably polyurethane rubber having a high modulus of elasticity, low compression set, and a high rate of recovery, e.g., a thermosetting polyester polyurethane of the type shown in Snyder U.S. Patents Nos. 2,623,031 and 2,623,033, is pressed between the supports 5 until all the interstitial spaces are filled without pores. This composition 7 is adhesively firmly bonded by an epoxy resin adhesive or by a Thiokol adhesive to the bottom of the spherical shell 1 and to the concrete foundation 4. The supports 5 and the flexible composition 7 form a concave spherical bearing surface 6 facing the spherical shell 1 of the tank and having the same curvature as that of said shell.

The described combination of an elastomeric cellular bed with a flexibly elastic filler material ensures an orthotropic transmission of the load to the concrete foundation 4. At the same time the bottom of the spherical shell 1 is effectively insulated from the concrete foundation 4 in a manner preventing electrolytic corrosion.

In the embodiment illustrated in FIG. 1, the radius of curvature of the concrete foundation 4 and the bearing shell 3 corresponds to the radius of curvature of the spherical shell 1. However, sometimes it may be desirable to distribute the loads so that they are greater at the periphery of the supporting bearing surface 6 and less in the center. In such a case the concrete foundation 4 and the bearing shell 3 may have a curvature exceeding that of the spherical shell 1, as shown in FIG. 3, and the supports 5 are covered with a tougher epoxy resin plastic bonding material, e.g., either a Thiokol mastic or an epoxy resin adhesive formulated with a high concentration (about 40–60%) or filler material such as silica gel, gamma aluminum oxide, whiting, clay, etc., at the periphery of the bearing surface 6 than in the center to prevent this material from being squeezed out sideways by the higher loads.

Figure 4:
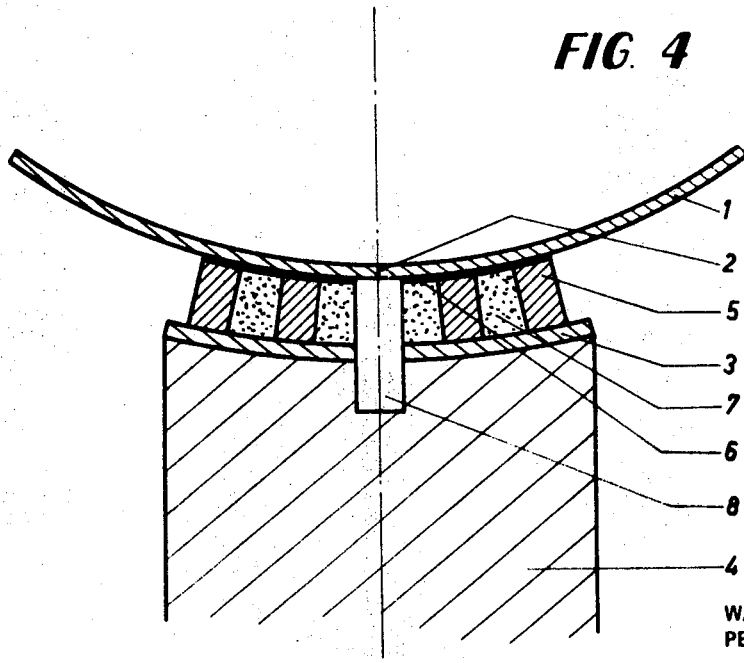

An alternative arrangement is that illustrated in FIG. 4 in which the curvature of the bearing surface of the concrete foundation 4 is less than that of the shell of the sphere so that the loads in the center exceed those at the periphery. In such an arrangement two different kinds of plastic bonding material may also be used, the tougher material covering the cellular supports 5 where the loads are greater, that is to say, in the center of the bearing surface.

It is desirable from time to time to inspect the seams 2 of the shell of the spherical tank. One such seam 2 is shown in FIGS. 3 and 4 in the region of the concrete foundation. In order to make this seam 2 accessible for inspection, a passage 8 is provided in the concrete foundation directly under the seam 2. A person can enter the passage 8 and thus gain access to the seam 2 for making the necessary inspection. The curvature of the bearing surface may again correspond to the curvature of the spherical shell or it may be greater or less than that of the shell.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

We claim:
1. In combination, a spherical tank for gases and liquids, a rigid load-bearing concrete foundation in the region of the vertical axis of said spherical tank, and a mounting consisting essentially of a plurality of compressible cellular support elements in spaced array within a matrix of non-elastomeric, flexible elastic material interposed between said foundation and the underside of said spherical tank, said compressible cellular support elements each having a generally cylindrical shape, the upper surface of the plurality of compressible cellular support elements and matrix being coated with an adhesive bonding layer, a load-bearing steel shell interposed between said concrete foundation and said plurality of compressible cellular support elements, and an adhesive bonding layer between the bottom of said compressible support elements and matrix and said load-bearing steel shell, said mounting assuring orthotropic transmission of the load of said tank to the foundation and insulating the bottom of the tank from the foundation to prevent electrolytic corrosion.

2. The combination as claimed in claim 1 wherein said non-elastomeric flexible elastic material is epoxy resin and said cellular elements consist of neoprene.

3. The combination as claimed in claim 1 wherein said non-elastomeric flexible plastic material is polyethylene sulfide and said cellular elements consist of butadiene-acrylonitrile rubber.

4. The combination as claimed in claim 2 wherein said adhesive for the upper and lower layers of the mounting consists of thermosetting epoxy resin.

5. The combination as claimed in claim 2 wherein said adhesive for the upper and lower layers of the mounting consists of thermosetting polyethylene sulfide resin.

References Cited
FOREIGN PATENTS
982,760  1965  Great Britain _____ 52—403

JOHN E. MURTAGH, Primary Examiner

U.S. Cl. X.R.

52—403; 220—3, 5